UNITED STATES PATENT OFFICE.

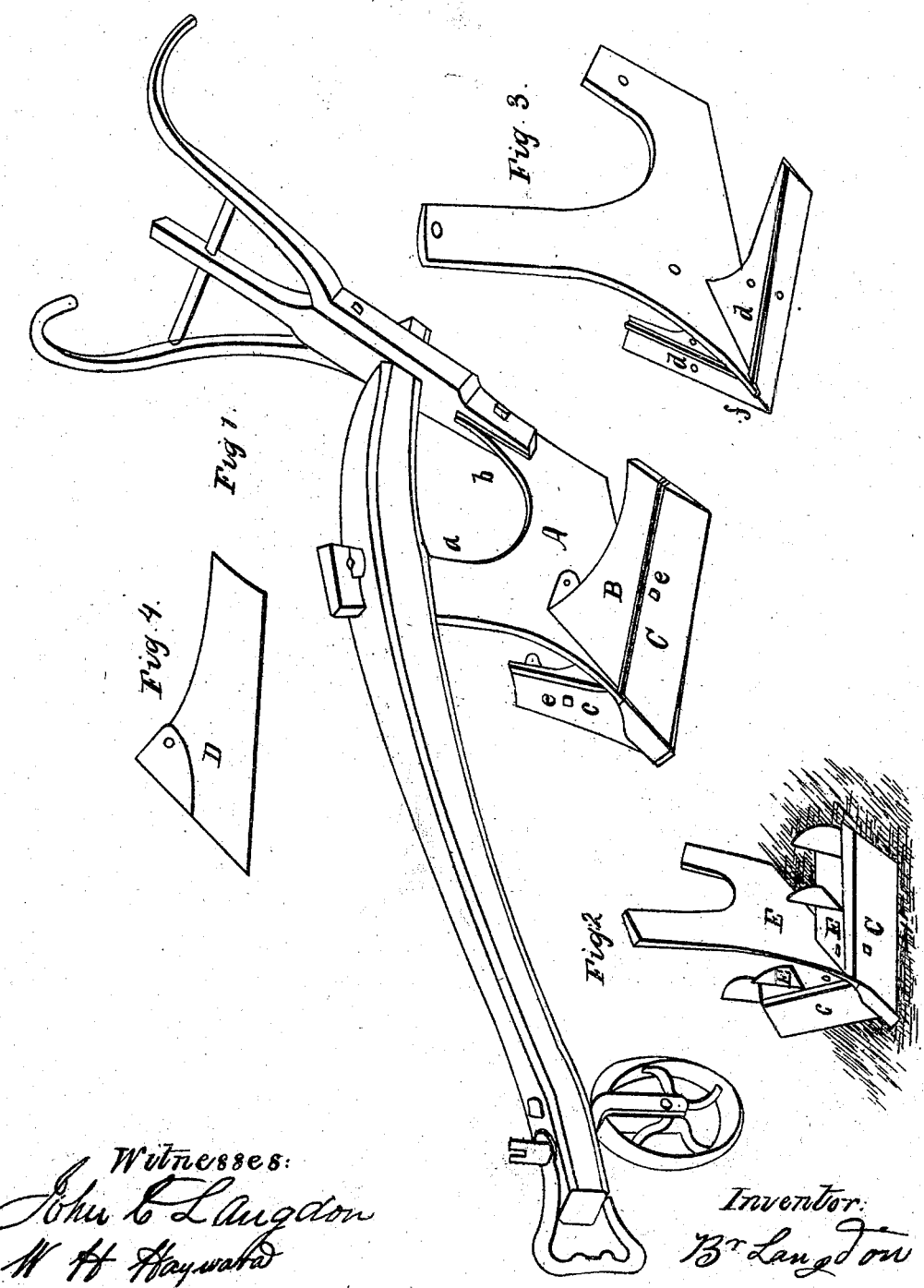

BARNABAS LANGDON, OF TROY, NEW YORK.

IMPROVEMENT IN PLOWS.

Specification forming part of Letters Patent No. 2,689, dated June 22, 1842.

*To all whom it may concern:*

Be it known that I, BARNABAS LANGDON, of the city of Troy, in the county of Rensselaer and State of New York, have invented a new and Improved Cultivator; and I do hereby declare that the following is a full and exact description.

The implement hereto be described being for the purpose of hilling corn, hilling and digging or turning potatoes out of the ground, and the like, and cutting up weeds between the same, as well as for loosening the ground, and being also in its form and proportions and mode of being managed somewhat in resemblance of the common plow, I have denominated it the "plow-cultivator." In connection with handles and beam like the plow, it consists of a cast-iron standard, as represented in Figure 1 of the annexed drawings, in which the branch *a*, of discretionary width, is connected with the beam in a manner similar to that usually adopted for attaching the plow colter and beam to each other. The other branch, *b*, is extended upward in an outwardly-inclined direction corresponding with the slant given to the handles, and far enough to allow of their being substantially attached thereto either in the manner shown in the drawings or by any other common mode of fastening. The lower edge of the standard is extended in a direct line horizontally to any discretionary length. From the forward termination of this edge, as shown at *f*, Fig. 3, in which the whole of the standard is separately represented, a plate, *d d*, is made to project as a wing on each side, extending back at an angle with the sides of the middle plate of about forty degrees, and having the forward edge of each wing on a level with the lower edge of that plate. From this forward edge the plate of the wings in a crosswise direction is inclined upward, so as to give to each about the slant of a common plow-share. These wings are cast with the upright part of the standard all as one piece, and for ordinary purposes they are made to spread from seven to eight inches from the middle plate on each side. The plate of the wings at the line of their junction with each other is about six inches wide and about three and a half at its outward termination. I vary them, however, in each and all of these particulars at my option.

From near the point of termination of the upright part of the standard, where it unites with the plate of the wings, as shown in the drawings, a rib about half an inch wide is raised from the upper surface of each wing, extending parallel to the forward edge of the plate to its outward extremity. The shoulder thereby formed on each side of the rib, in connection with the surface of the plate, constitutes a seat or bed for the several appendages yet to be described. A share or cutter, (shown in its place at C C, Figs. 1 and 2, being in the form of its construction fitted to the bed thus provided on the forward side of the rib, is there secured by means of a bolt through each wing, as at *e e* in the figures last referred to, with nuts on the under side. This cutter, including both wings, is also cast whole as one piece, having a section of small cutting width and of a chisel form in front, as shown in the same figures, for the purpose of favoring the practical operation of the implement; and I give to the forward edge of the upright part of the standard, as also shown in the drawings, a curve and slant corresponding with this form of construction of the cutter.

A mold-board is also provided, and placed, when employed, on the upper side of the rib, with its lower edge resting against it, being otherwise fitted to the entire bed or seat as thus provided, and it will be perceived that it is adapted to mold-boards of various widths, as occasion may require. One is shown in place at B, Fig. 1, and separately in Fig. 4, with a flange from its inner upper corner for attaching it to the standard by means of a screw-bolt. As these mold-boards are only used occasionally when required, I call them "portable" mold-boards. I usually employ them for hilling, turning out potatoes, or the like.

For the purpose of loosening the ground or reducing its surface to a finer state than it was previously in, I provide a plate to be fixed over each wing in the seats, as already described for the mold-boards, as shown in their place at E E, Fig. 2, supplied with two or more upright cutters, each extending up from two to three inches from the plate vertically as respects the plates of the cutters themselves, but with their forward cutting-edges slanting back at an angle from a perpendicular of about thirty-five degrees, or so as to prevent the lodgment of weeds or the like against them. The bottom of the upright cutters extend across the plate to which they belong in directions parallel to the sides of the upright post of the standard.

The depth of the ribs upon the wings of the standard, as above described, is about equal to the thickness of the plates to be placed in connection with them on each side, in order to present an even outside surface.

In the practical application of the above-described cultivator to the purpose of cutting up weeds, hilling corn, or the like, it is necessary to employ a wheel at the forward end of the beam, as represented in Fig. 1, in order thereby to regulate the depth of its cutting; but in digging or turning out potatoes from the ground the wheel is to be dispensed with.

What I claim, and desire to secure by Letters Patent, is—

The standard with its wings, as above described, and in combination therewith the angular double share or weed-cutter and the portable mold-boards, and also the upright cutters with the plates to which they belong, all as above described.

Subscribed this 9th day of June, 1842.

B. LANGDON.

Witnesses:
DANIEL WHITING,
JOHN C. LANGDON.